United States Patent [19]

Ohsawa

[11] Patent Number: 4,936,693
[45] Date of Patent: Jun. 26, 1990

[54] LABEL PRINTING DEVICE

[75] Inventor: Masayuki Ohsawa, Mishima, Japan

[73] Assignee: Tokyo Electric Co., Ltd., Tokyo, Japan

[21] Appl. No.: 430,108

[22] Filed: Nov. 1, 1989

Related U.S. Application Data

[63] Continuation of Ser. No. 863,965, May 16, 1986, abandoned.

[30] Foreign Application Priority Data

May 28, 1985 [JP] Japan .................. 60-114899

[51] Int. Cl.$^5$ .................................. B41J 5/00
[52] U.S. Cl. ............................ 400/104; 177/4; 364/466
[58] Field of Search .............. 400/103, 104, 61, 76; 101/288; 364/466; 177/3-4, 31, 25.11, 25.12, 25.13, 25.15, 25.17, 25.18

[56] References Cited

U.S. PATENT DOCUMENTS

| 4,229,794 | 10/1980 | Foster | 177/4 |
|---|---|---|---|
| 4,276,112 | 6/1981 | French et al. | 177/4 |
| 4,365,148 | 12/1982 | Whitney | 177/4 |
| 4,398,253 | 8/1983 | Karp et al. | 177/4 |
| 4,423,486 | 12/1983 | Berner | 177/25.13 |
| 4,598,780 | 7/1986 | Iwasaki et al. | 177/4 |
| 4,659,416 | 4/1987 | Johansson | 400/103 |
| 4,661,001 | 4/1987 | Takai et al. | 400/120 |
| 4,712,929 | 12/1987 | Kitaoka | 101/288 |
| 4,832,513 | 5/1989 | Iuekita | 177/4 |

FOREIGN PATENT DOCUMENTS

| 11187 | 1/1983 | Japan | 400/103 |
|---|---|---|---|
| 136273 | 8/1984 | Japan | 400/104 |
| 87072 | 5/1985 | Japan | 400/103 |
| 2072098 | 9/1981 | United Kingdom | 400/103 |
| 2077663 | 12/1981 | United Kingdom | 400/103 |

OTHER PUBLICATIONS

Lancer et al, "Bar-Code Symbol Recognition" IBM Technical Disclosure Bulletin vol. 25, No. 6, pp. 2852-2860 11/82.

Primary Examiner—Eugene H. Eickholt
Attorney, Agent, or Firm—Frishauf, Holtz, Goodman & Woodward

[57] ABSTRACT

A label printing device is disclosed, which comprises a keyboard having a plurality of numeral keys for inputting an article code, a data generator for generating data necessary for the formation of bar code data according to the article code, a printer and a control unit for forming bar code data having an arrangement predetermined by a bar code format read out from the memory according to data from said data generator and causing the printer to print the bar code data on label. In the memory are stored different bar code formats corresponding to a plurality of operation modes including registration and training. The control unit reads out, according to the input article code and the operation mode selected by the operation mode selection unit, a corresponding bar code format from the memory.

4 Claims, 6 Drawing Sheets

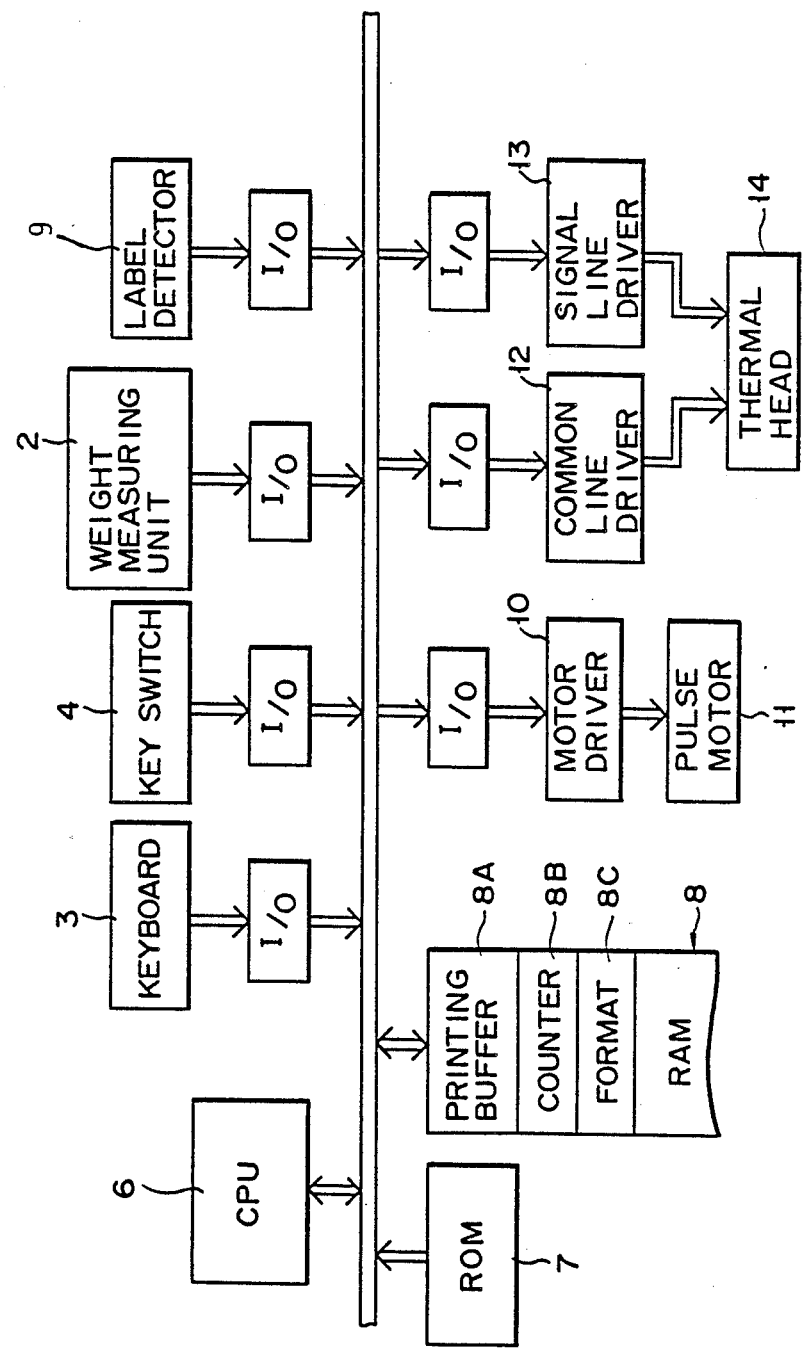
F I G. 2

F I G. 3
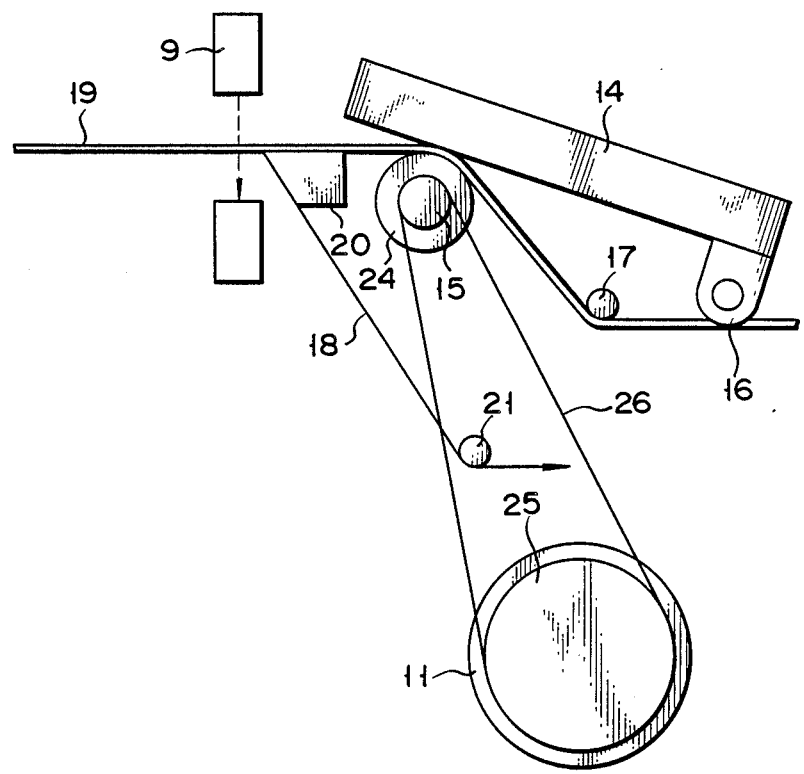

LABEL PRINTING DEVICE

This application is a continuation of application Ser. No. 07/863,965, filed May 16, 1986 now abandoned.

BACKGROUND OF THE INVENTION

This invention relates to a label printing device which can print a bar code.

Heretofore, there has been known a label printer for printing bar code data containing article code data, price data, etc. In this type of label printer, a predetermined bar code format is stored in a removable bar code format memory, and bar code data representing article code, price, etc. is formed in the bar code format and printed. In the label printer it is required to use a bar code format memory, in which a predetermined format is stored, to form and print bar code data in different formats.

Further, with the same bar code format no particular problem is raised so long as the label issuance condition is the same. However, when an electronic cash register having a label printer and a bar code printer is used by a new operator for the purpose of training, it is required to issue a label which is clearly distinguished from a label which is issued in the registration mode for attachment to an an article to be actually sold. For this reason, a check digit C/D constituting a portion of the bar code is altered to a value which is greater by "1" than the value at the time of the registration mode. However, the value of C/D is not a value determined by the normal C/D calculation method. Therefore, the cash register with bar code reader is liable to erroneously read the bar code. As a result, price data that is printed on label for the purpose of training is read out by a cash register to be added to sales total memory, making the sales total data erroneous.

SUMMARY OF THE INVENTION

An object of the invention is to provide a label printing device, which form bar code data with different bar code formats corresponding to a plurality of different operation modes such as registration and training modes for printing on label.

The above object of the invention is attained by a label printing device comprising a memory for storing different bar code formats in correspondence to a plurality of operation modes including a registration mode and a training mode. An input unit is provided for inputting article designation data for designating an article. An operation mode selection unit can be used to select an operation mode. A data generator generates data necessary for the formation of bar code data according to the article designation data. A control unit reads out, according to the article designation data and operation mode selected by the operation mode selection unit, a corresponding bar code format from the memory, and then forms bar code data arranged in an arrangement determined by the read-out bar code format according to data from the data generator and causing a printer to print the bar code data on a label.

According to the invention, bar code data corresponding to article designation data and selected operation mode is read out from the memory, and bar code data is formed according to data arrangement determined by the read-out format. Therefore, bar code data at the time of the registration mode can be clearly distinguished from bar code data at the time of the training mode.

BRIEF DESCRIPTION OF THE DRAWINGS

FIG. 2 is a block diagram of a control circuit used in the label printing device shown in FIG. 1A;

FIG. 3 shows a paper feeder unit and a printer unit used for the label printing device shown in FIG. 1;

DETAILED DESCRIPTION OF THE INVENTION

Figure 1A:
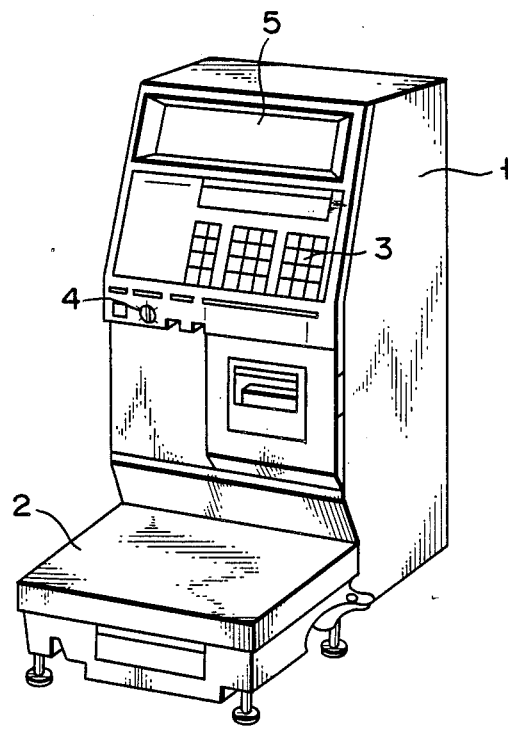
FIGS. 1A and 1B illustrate an embodiment of the label printing device according to the invention and a key switch used for the label printing device.
Figure 1B:
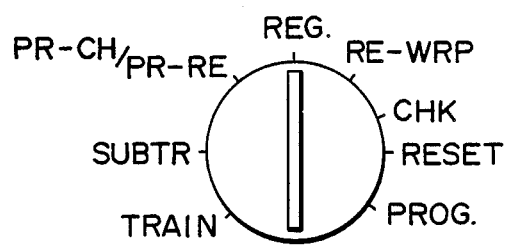

FIGS. 1A and 1B illustrate an embodiment of the label printing device according to the invention. The illustrated label printing device comprises housing 1 and weight measuring unit 2. Housing 1 has keyboard 3 provided on the front side and having a plurality of numeral keys. Also, it is provided with key switch 4 as shown in FIG. 1B and display 5. Key switch 4 serves to select various modes such as training, subtraction, price change/discount, registration, rewrapping, inspection, adjustment, setting etc.

FIG. 2 is a block diagram showing a control circuit provided in housing 1. The control circuit includes CPU 6 which is connected to key switch 4, weight measuring unit 2 and key switch 3. CPU 6 includes read-only memory (ROM), in which various bar code formats and programs to be executed by CPU 6 are stored, print buffer 8A, counter 8B and format area 8C. It is connected to random access memory 8, in which results of calculation by CPU 6 are stored, and label detector 9. Pulse motor 11 is connected to CPU 5 via a pulse motor driver 10. Thermal head 14 is connected to CPU via common line driver 12 and signal line driver 13.

FIG. 3 is a schematic view showing a printer unit and a paper feeder unit. Rectangular label 19 is continuously applied to elongate base sheet 18. Base sheet 18 is taken up on a base sheet take-up unit via guide roller 17, platen roller 24, separator 20 and guide roller 21. Thermal head 14 pivotally supported on shaft 16 is provided on top of platen roller 24 such that it can effect printing in contact with label 1. Thermal head 14 consists of a plurality of heat-generating elements arranged in a row extending in a direction perpendicular to the direction of feed of label. Base sheet 19 is sharply bent round the sharp end of separator 20, so that label 1 is separated from base sheet 19 to be forced out horizontally. To detect label 1 which is thus forced out, label detector 9 is provided in the close vicinity of separator 20. The shaft of platen roller 24 has pulley 15, and the shaft of pulse motor 11 has a pulley 25. A timing belt 26 is passed round pulleys 15 and 25. The paper feeder unit and printer unit as above are disclosed in detail in, for instance, U.S. Pat. No. 4,434,911.

Figure 4A:
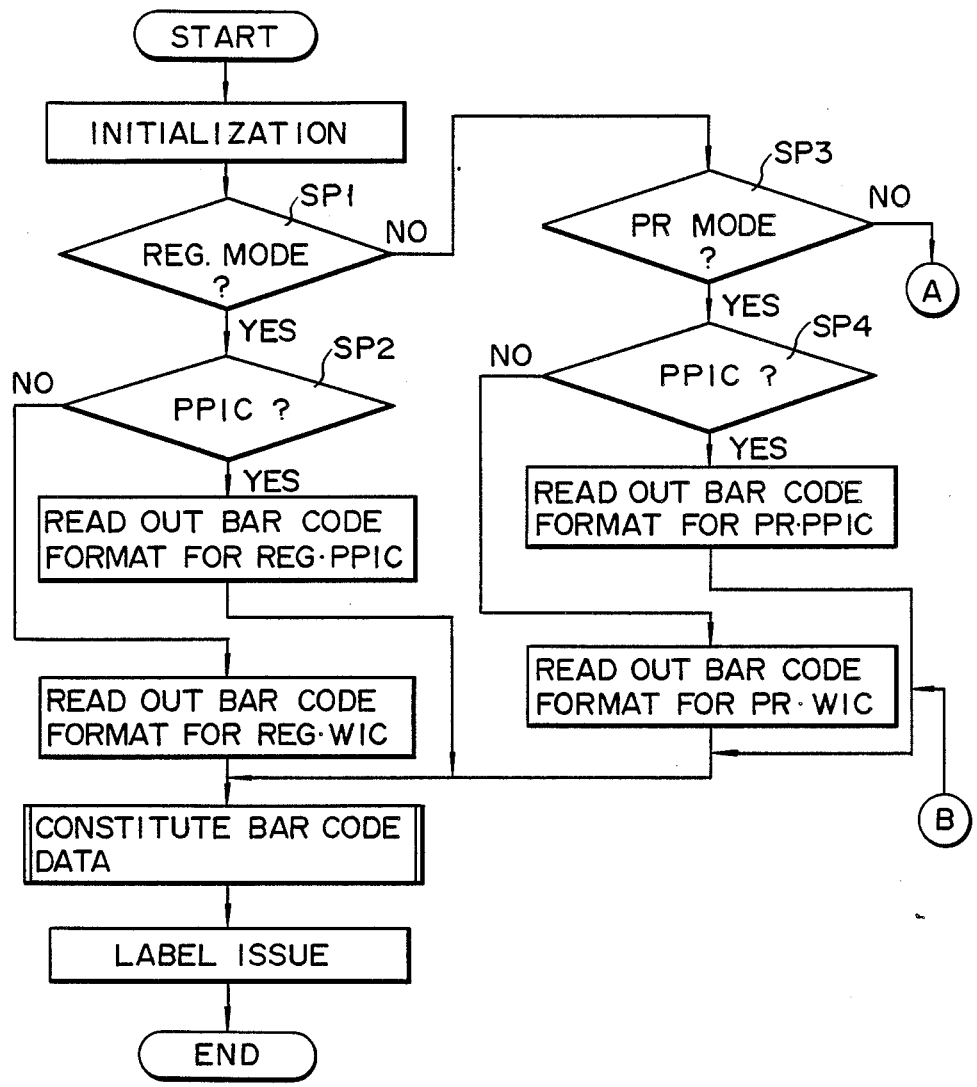
FIGS. 4A and 4B illustrate a flow chart for explaining the operation of a control circuit shown in FIG. 2.
Figure 4B:
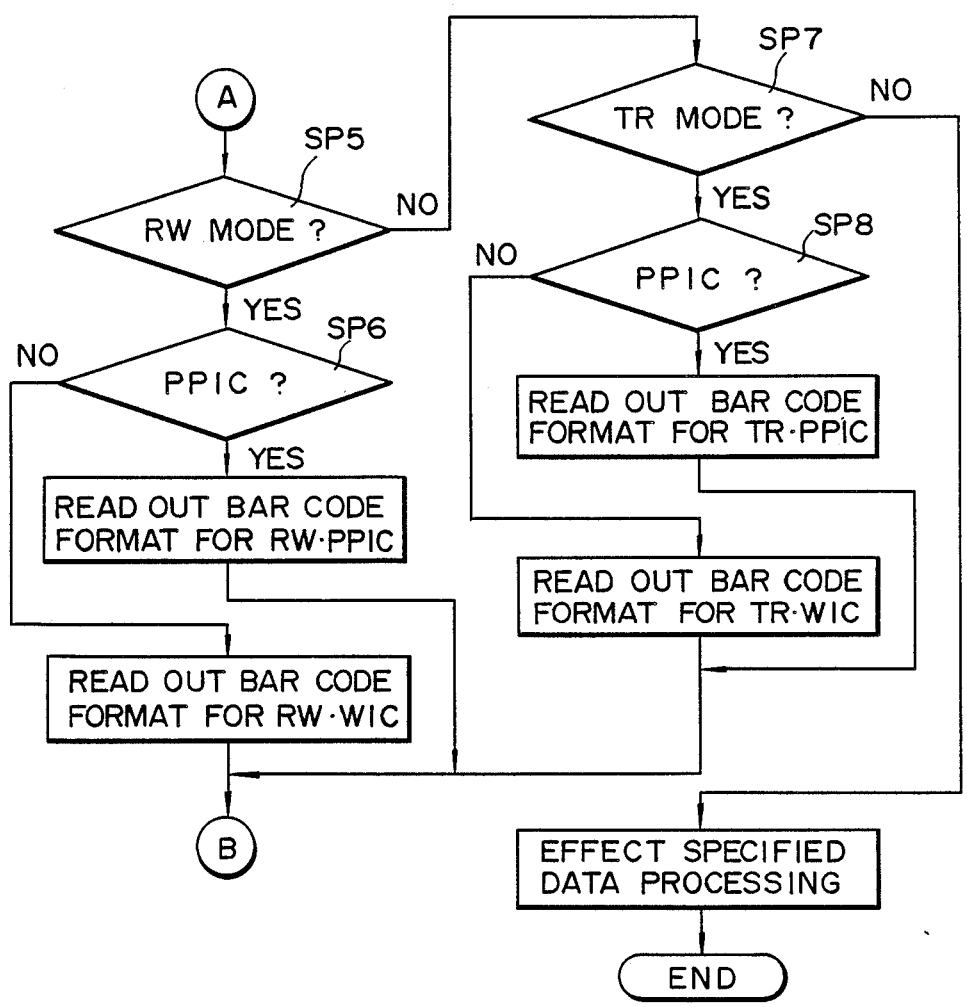

FIGS. 4A and 4B show a flow chart for explaining the operation of the control circuit shown in FIG. 2. When a power switch is turned on, CPU 6 initializes RAM 8, pulse motor 11, etc. When an article is placed on weight measuring unit 2 so that CPU 6 receives weight data from weight measuring unit 2, CPU 6 executes step SP1 of check as to whether the operation mode is a registration mode, i.e., ordinary label issuance mode, from the switching position of key switch 4. If it is determined that the operation mode is the registration mode, CPU 6 executes step SP1 of check as to whether the issuance condition is predetermined price issuance (PPIC) on the basis of a condition flag contained in PLU (price look-up) data read out according to numerical data fed by operation of keyboard 3 and constituting a bar code. When it is determined that the issuance condition is not predetermined price issuance but weighing issuance (WIC), CPU 6 reads out from ROM 7 a bar code format "0, 2, C2, C3, C4, C5, C6, PC/D, P1, P2, P3, P4, C/D" which is coincident with registration weighing issuance condition (REG, WIC) and stores it in format memory area 8c of RAM 8. In this format, the first two digits constitute constant number data representing a weighing condition, digits C2 to C6 constitute an article code, digits P1 to P4 constitute price data, digit PC/D a price No. check digit, and digit C/D an overall format check digit. Then, CPU 6 forms a bar code according to a routine according to a bar code formation routine shown in FIG. 5 and stores it in print buffer 8A of RAM 8. Then, CPU 6 drives thermal head 4 according to bar code data of print buffer 8A. At his time, it also drives pulse motor 11 to feed base sheet 19 to print a bar code on label 19 and issue the code.

When the check of step SP2 yields "YES", CPU 6 reads out from ROM 7 a bar code format "0,0,0,C2,C3,C4,C5,0,0,0,0, C6,C/D" which is coincident with the registration predetermined price issuance condition and stores it in format area 8C of RAM 8. In this format, the first two digits represent a predetermined price condition. In this case, the price data has been predetermined by the article code, so that "0000" has been set in the format. Subsequently, CPU 6 forms bar code data and prints it on label for issuance in the manner as described above. The constant price issuance means that a label is issued to an article, the price of which has been predetermined with price data stored in ROM 7. Weighing issuance means that a label is issued to an article, the price of which is not predetermined but the price of its unit weight, i.e., unit cost, is stored in ROM 7 so that the weight varies according to the weight.

When the check of step SP1 yields "NO", a check is done in step SP3 as to whether a "discount" mode is set in key switch 4. When the check of step SP3 yields "YES", a check of issuance condition is done in step SP4 as in the case of step SP2. When a check of step SP4 yields "NO", a bar code format "0,2,C1,C2,C3,C4,C5,C6, P1,P2,P3,P4,C/D" coincident with price reduction weighing issuance (PR.WIC) is read out from ROM 7 and stored in format area 8c of RAM 8. This format does not contain price check digit PC/D, so that it is clearly distinguished from a bar code format corresponding to the registration weighing issuance condition. When the check of step SP4 yield "YES", a bar code format "0,0,C2,C3, C4,C5,C6,PC/D,P1,P2,P3,P4,C/D" coincident with the price reduction predetermined price issuance (pR.PPIC) is stored in format area 8C. Subsequently, CPU 6 forms, in the manner as described above, bar code data according to the input commodity code and prints it on label 19 for issuance.

When the check of step SP3 is "NO", a check is done in step SP5 as to whether a "re-wrap" mode is set by key switch 4. When the check of step SP5 yields "YES", a check of the issuance condition is done in step SP6 as in step SP2. When the check of step SP6 yields "NO", a bar code format "0,2,0,C2,C3,C4,C5,C6,P1,P2,P3,P4,C/D" coincident with the re-wrap weighing issuance condition (WR.WIC) is stored in format area 8C. When the check of step SP6 is "YES", a bar code format "0,0,C2,C3,C4, C5,C6,0,P1,P2,P3,P4,C/D" coincident with the re-wrap predetermined price issuance condition (WR.PPIC) is stored in format area 8C. Subsequently, CPU 6 forms bar code data according to the input article code and prints it on label 19 for issuance as the manner as described above.

When the check of step SP5 yields "NO", CPU 6 executes step SP7, in which a check is done as to whether the operation mode is the training mode. When the check of step SP7 yields "YES", the issuance condition is checked in step SP8. When the check of step SP8 is "NO", a bar code format "0,2,C2,C3,C4,C5,C6,0,P1,P2,P3, P4,C/D" coincident with the training weighing issuance condition (TR.WIC) is stored in format area 8C. When the check of step SP8 yields "YES", a bar code format "0,0,0,0,0,0,0,C2,C3,C4,C5,C6,C/D" coincident with the training predetermined price issuance condition (TR.PPIC) is stored in format area 8C. Subsequently, CPU 6 forms bar code data according to the input article code and prints it on label 19 for issuance in the manner as-described above.

When the check of step SP7 is "NO", other operations such as reset or program are executed according to the switching position of key switch 4.

Figure 5:
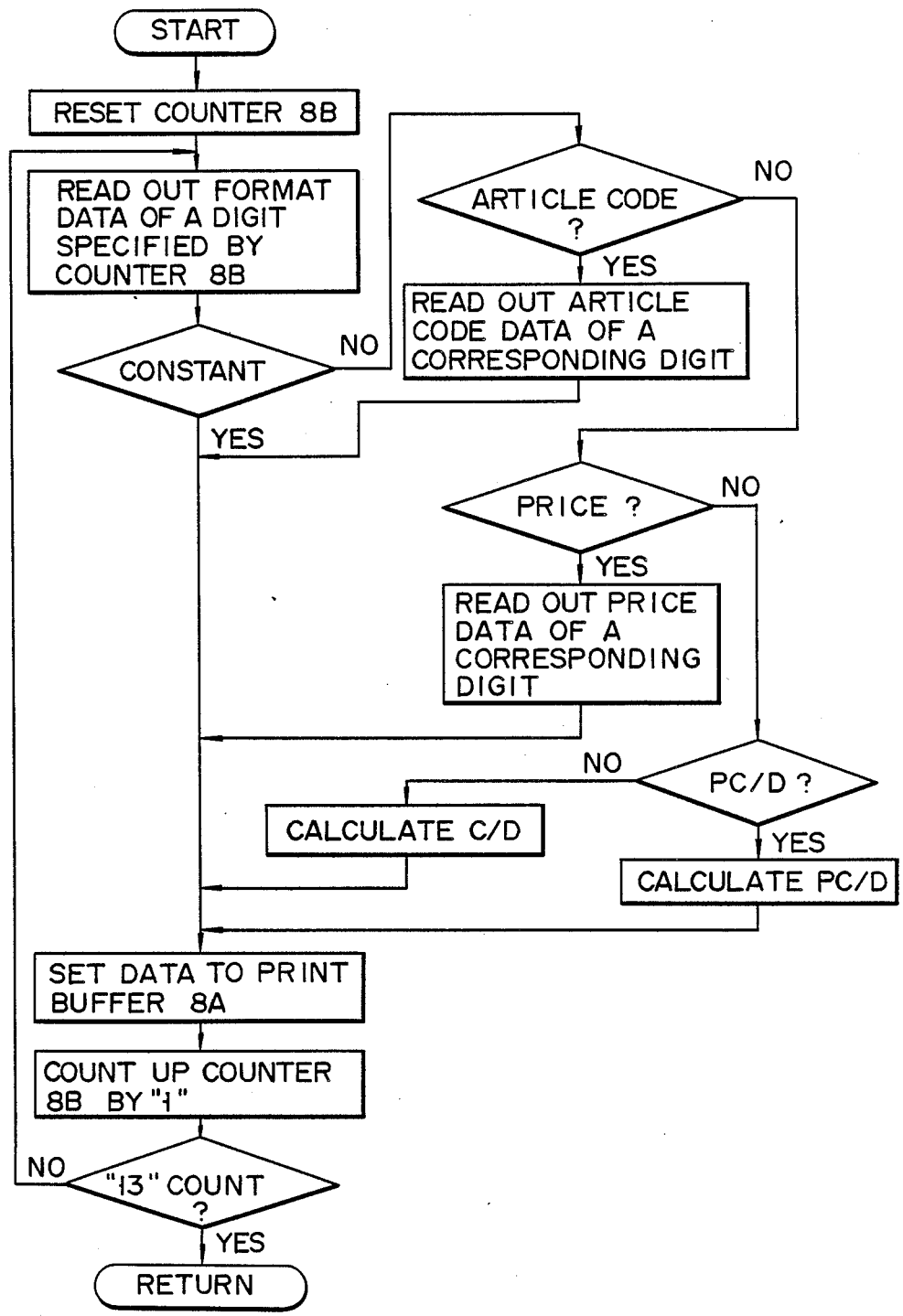
FIG. 5 is a flow chart showing a bar code data formation routine in the flow chart shown in FIG. 4.

The method of formation of a bar code data will now be described with reference to FIG. 5.

First, counter 8B in RAM 8 is reset. Then, CPU 6 reads out constant data, article code data and price data for each digit in an order determined by the operation mode and issuance condition from RAM 8 and stores it in a printing buffer 8A. At the same time, the content of counter 8B is increased by "1". The counting is ended when the count reaches "13".

For example, in case of registration weighing issuance condition, when the contents of counter 8B are "0" and "1", constant data "0" and "2" are read out from format memory 8C and stored in first and second digit positions of printing buffer 8A. Further, when the contents of counter 8B are "2" to "6", article code data corresponding to article code data (C2 to C6) read out from format memory 8C is read out from RAM 8 and stored in the third to seventh digit positions of printing buffer 8A. When the contents of counter 8B become "7", PC/D is calculated by making use of the values of the individual digits of price data (P1 to P4) in RAM 8 in a predetermined calculation method and is stored in the eighth digit position of print buffer 8A. When the contents of counter 8B are "8" to "11", price data (P1 to P4) is read out from RAM 8 and stored in the ninth to twelfth digit positions of print buffer 8A. In the case of predetermined price issuance condition, price data "0000" stored in the format memory 8C is written into print buffer 8A, and in the case of weighing issuance condition, price data obtained based on the weight data is stored in print buffer 8A. When the contents of counter 8B subsequently become "12", C/D is calculated by making use of the values of the constant data, article code data and price data in a predetermined calculation method. When bar code data is stored in print buffer 8A in this way, CPU 6 prints the bar code data on label 19 for issuance according to the contents of print buffer 8A.

When issuing a label using a label printer shown in FIGS. 1A, 1B and 2, the operator first sets key switch 4 to a predetermined switching position and then inputs article data and other data by operating keys on keyboard 3. The input key data or article code is temporarily stored in RAM 8. According to the input key data CPU 6 reads out price look-up data (PLU) including condition flag from ROM 7 and forms a bar code in the procedure shown in FIG. 4. When the condition flag is "0" indicative of the weighting issuance, CPU 6 stores constant data "0,2" in ROM 8 and stores price data calculated from price data contained in PLU data and weight data from weight measuring unit 2 in RAM 8. When the condition flag is "1" indicative of the predetermined price issuance condition, CPU 6 stores constant data "0,0" and price data "0,0,0,0" in RAM 8. Then, CPU 6 stores a bar code format designated according to the operation mode and issuance condition in format area 8C. Subsequently, CPU 6 successively stores constant data, article code, price data, PC/D and C/D from RAM 8 in individual digits of print buffer 8A according to the count of counter 8B while counter 8B is up-counting one by one as has been described with reference to the flow chart shown in FIG. 5. Then, CPU 6 prints bar code data stored in print buffer 8A on label 19 for issuance.

As has been shown, in the above embodiment different bar code formats are selected according to the operation mode such as registration, price reduction, rewrap, training, etc. and issuance condition, and constant data, article code data, price data, C/D, etc. are printed on label with data arrangement according to the selected bar code format. Thus, the training label is clearly distinguished from the registration label, etc. Further, PC/D contained in bar code data is calculated using a predetermined calculation system using price data contained in bar code data. C/D is calculated by a predetermined calculation system by making use of bar code data excluding C/D and other data. Therefore, PC/D and C/D will never be read out as erroneous information by bar code printer.

While an embodiment of the invention has described in the foregoing, this invention is by no means limited to this embodiment. For example, in the above embodiment according to the input article code CPU 6 stores price data "0000" in RAM 8 under the predetermined price issuance condition, while storing unit price data and price data obtained according to the weight data under the weighing issuance condition. However, it is possible to input price data "0000" under the predetermined price issuance condition and price data displayed on display 5 under the weighing issuance condition by operating keys on the keyboard.

It is also possible to use a "constant" key, "article code" key and "price" key instead of counter 8B in order to designate the respective data positions. This makes it possible to input constant data, article code data and price data by operating numeral keys and at least one of the "content", "article code" and "price" keys.

What is claimed is:

1. A label printing device comprising:
   operation mode selection means for selecting one of operation modes including a registration mode and a training mode;
   input means for inputting article-designation data designating articles;
   data generating means for generating items of data necessary for forming bar code data, according to the article-designation data;
   memory means for storing a plurality of bar code formate assigning said data items to different groups of digits constituting the bar code data;
   printing means; and
   control means for reading out a bar code format from said memory means according to the article-designation data and the operation mode selected by said operation mode selection means, for arranging the data items generated from said data generating means in accordance with the readout bar code format to form bar code data, and for causing said printing means to print the formed bar code data on a label.

2. A label printing device according to claim 1, wherein said input means is a keyboard having a numeral key pad to be operated to input article designation data such as article codes.

3. A label printing device according to claim 2, wherein each of said bar code formats includes constant data, dummy article codes, dummy price data and check data, and said control means has a print buffer, a counter for sequentially designating the digits of each bar code format and a control unit for supplying the constant data, article data, price data or check digit to the print buffer in accordance with the digit designated by the counter.

4. A label printing device according to claim 3, wherein said data generating means has second memory means storing predetermined price data and unit price data and weighing means for generating weight data representing the weight of article, and said control means inputs the dummy price data as price data to the print buffer when the article code represents article of a predetermined price, and inputs the price data obtained from the weight data and unit price data to said print buffer when the article code represents article of a predetermined unit price.

* * * * *